United States Patent [19]
Altenpohl et al.

[11] Patent Number: 4,754,822
[45] Date of Patent: Jul. 5, 1988

[54] REPETITIVE WEIGHING SYSTEM FOR MOVING CONVEYOR LOADS

[75] Inventors: Paul J. Altenpohl; Paul J. Altenpohl, Jr., both of Gladwyne, Pa.

[73] Assignee: W. F. Altenpohl, Inc., High Point, N.C.

[21] Appl. No.: 111,271

[22] Filed: Oct. 22, 1987

[51] Int. Cl.⁴ .................... G01G 19/00; G01G 19/04
[52] U.S. Cl. ..................................... 177/145; 177/163
[58] Field of Search ................ 177/145, 163, 185; 198/504, 505; 209/593, 595

[56] References Cited

U.S. PATENT DOCUMENTS 3,894,592  7/1975  Andersson et al. ............ 177/163
4,300,644  11/1981 Meyn ............................. 177/163 X
4,709,770  12/1987 Kohashi et al. ................ 177/185 X
4,711,344  12/1987 Altenpohl ...................... 177/163 X Primary Examiner—George H. Miller, Jr.
Attorney, Agent, or Firm—Fleit, Jacobson, Cohn & Price

[57] ABSTRACT

A continuously moving load is conveyed through a plurality of weighing load cell assemblies during a weighing operation to obtain a predetermined number of repetitive weight measurements fed to a data processor for providing an error corrected readout. Individual weight measurements are monitored to identify load cell assemblies from which erroneous readings are derived and to remove such erroneous readings from the data processing operation.

18 Claims, 5 Drawing Sheets

REPETITIVE WEIGHING SYSTEM FOR MOVING CONVEYOR LOADS

BACKGROUND OF THE INVENTION

1. Field of the Invention

This invention relates generally to the weighing of individual loads during continuous movement thereof, and more particularly to a weight measurement system for obtaining accurate weight data with respect to continuously moving products or the like suspended from a processing conveyor.

In the processing of products such as poultry, especially when performed on a large scale, it is becoming more essential from an economy and marketing standpoint that accurate weight measurements be obtained with respect to such products during continuous movement suspended from a processing conveyor. The weight measurements are utilized, for example, to sort or classify the products in connection with packaging, labeling and/or sale to consumers. The need for accuracy in weight measurement is apparent since the weight sorting operation is based on limited deviation of product weight from either center weight values within different weight ranges, or deviation from different weight limits. Accurate weight measurements are also essential where plural product weight totals are required.

2. Description of Related Art

The use of electronic load cells of the strain gauge type has come into wide use for product weighing purposes in the poultry processing art, aforementioned. The need for correcting such measurements through a data processing system because of various error producing factors, is well recognized as exemplified by the disclosures in U.S. Pat. Nos. 4,525,794 and 4,691,290 to Scheffer, et al, and Griffin, respectively. The use of electronic load cells and data processing systems in connection with poultry weight sorting operations is disclosed for example in U.S. Pat. Nos. 4,413,739 and 4,483,047 to Kohashi and Linville, Jr., respectively. The use of a plurality of load cells to provide a totalized target weight, on the other hand, is disclosed for example in U.S. Pat. Nos. 4,372,099, 4,388,975, 4,566,070 and 4,550,792 to Linville, Hirano, Tanaka and Mosher, et al, respectively.

One particular source of error in weight measurement arises because of load vibration on the load cell during the weighing operation, as recognized and dealt with in U.S. Pat. Nos. 4,347,903, 4,553,619 and 4,660,160 to Yano, et al, Fujinaga and Tajimia et al, respectively. According to the Tajimia patent, weight measurement display is limited to a correct measurement through time-controlled sampling and difference comparison in the data processing system. According to the Yano, et al and Fujinaga patents, a continuous analog output of the load cell is digitized, sampled and averaged in order to obtain correct weight measurement readout from the data processor.

Despite the recognized need for accuracy in weighing continuously moving objects such as poultry products suspended from a processing conveyor, and the availability of prior art data processing systems with error correcting capabilities, as aforementioned, the weight accuracy problem still persists. In the poultry processing art, such problem involves a host of variable and unpredictable error producing conditions including irregular load movement, equipment vibration, impacting debris and liquid particles, etc. Further, changing environmental conditions in any single processing plant and/or different conditions in different processing plants often renders the aforementioned prior art error correcting systems unfeasible from the standpoint of consistency, economy or installational adaptability.

It is therefore an important object of the present invention to provide a weight measurement system for moving conveyor suspended loads such as poultry products that is readily adaptable to different installational conditions in producing a high degree of consistent accuracy for the weight measurements obtained despite the presence of variable error-producing factors.

SUMMARY OF THE INVENTION

In accordance with the present invention, each load undergoes a weighing operation suspended from a processing conveyor by continuous movement along the conveyor path past a plurality of spaced scales providing repeated weight measurements for each load from which a single error-corrected weight measurement is ultimately obtained for each load. Each scale is formed by a pair of electronic load detecting devices disposed on laterally opposite sides of the conveyor path. According to one embodiment of the invention, each load detecting device is a strain gauge type of load beam cell anchored at one end to a fixed track along which load carrying shackles are pulled by the conveyor while supported by rollers on the fixed track during the weighing operation. The other end of the load beam cell is anchored to a vertically displaceable load transferring platform over which the shackle supporting rollers pass to transfer the load to the load beam cell thereby producing an analog output therefrom representative of the shackle carrier load or weight. Thus, the conveyor path extends between laterally spaced pairs of such load transferring platforms, each extending a limited distance along the conveyor path to form a scale assembly with the pair of load beam cells associated therewith. The analog output of each pair of load cells is derived from bridge circuit configurations of which the variable resistive components are formed by the load beam cells.

The analog output of each scale assembly is amplified, digitized and fed to a data processor in which all of the digitized outputs received from the respective scale assemblies during a given weighing operation are averaged to provide the error corrected weight measurement readout. The number of scale assemblies utilized for such weighing operation is empirically determined for any given installation to establish statistically optimum accuracy for the weight measurement readout. Because of the lack of predictability in the sustained accuracy of the individual scale assemblies, the load weighing arrangement is provided with selective control means for disabling any one or more of the plural scale assemblies exhibiting erroneous operational characteristics.

In regard to the aforementioned selective scale disabling feature, the invention contemplates the monitoring of the outputs of each scale assembly to detect erroneous readings therefrom, identifying the scale assembly from which the erroneous readings are detected and cancelling the output fed by such identified scale assemblies to the data processor. The accuracy of the weight measurement readout is thereby preserved or improved.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DESCRIPTION OF THE PREFERRED EMBODIMENT

Figure 1:
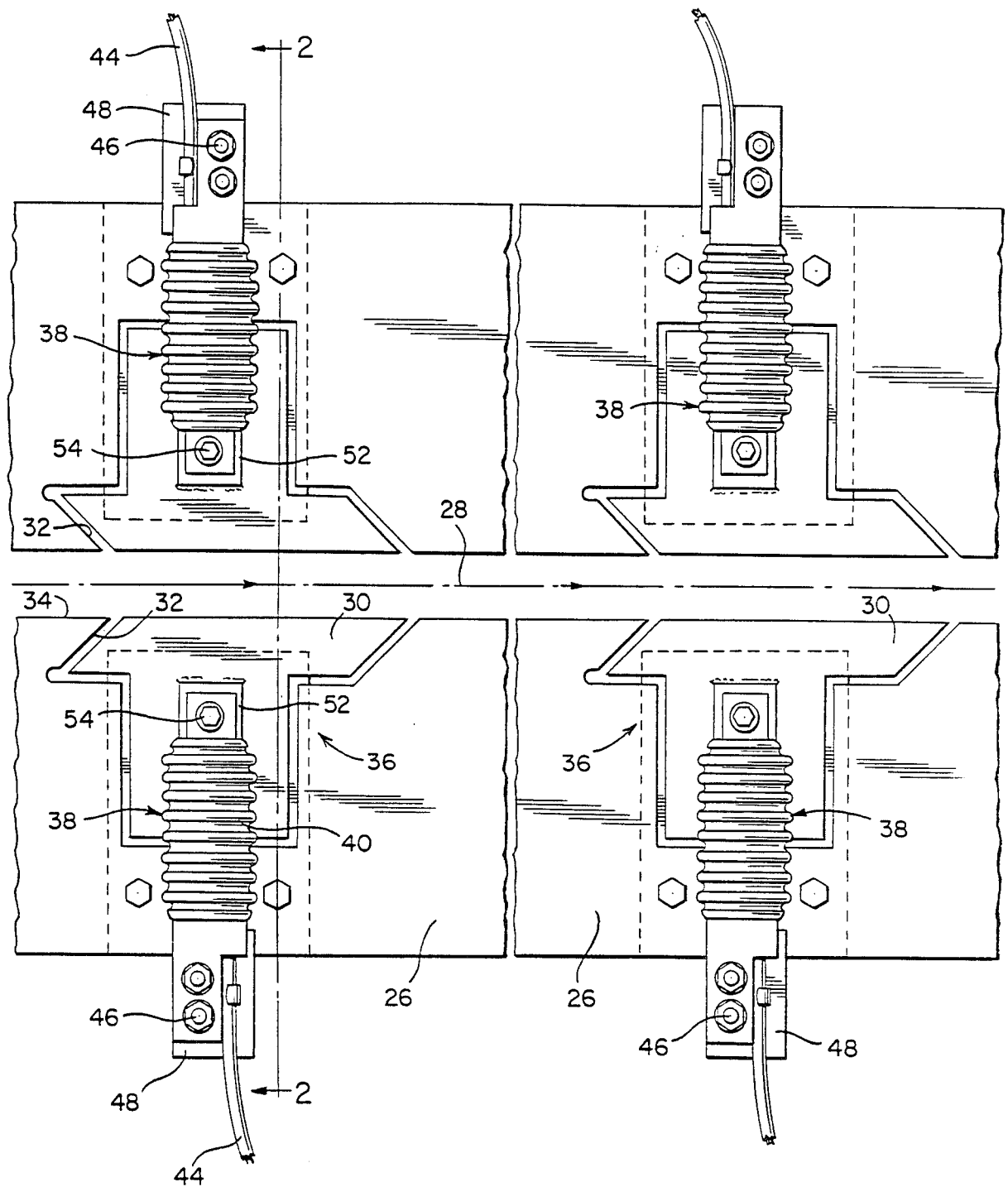
FIG. 1 is a partial top plan view of a conveyor load weighing arrangement in accordance with one embodiment of the invention.
Figure 2:
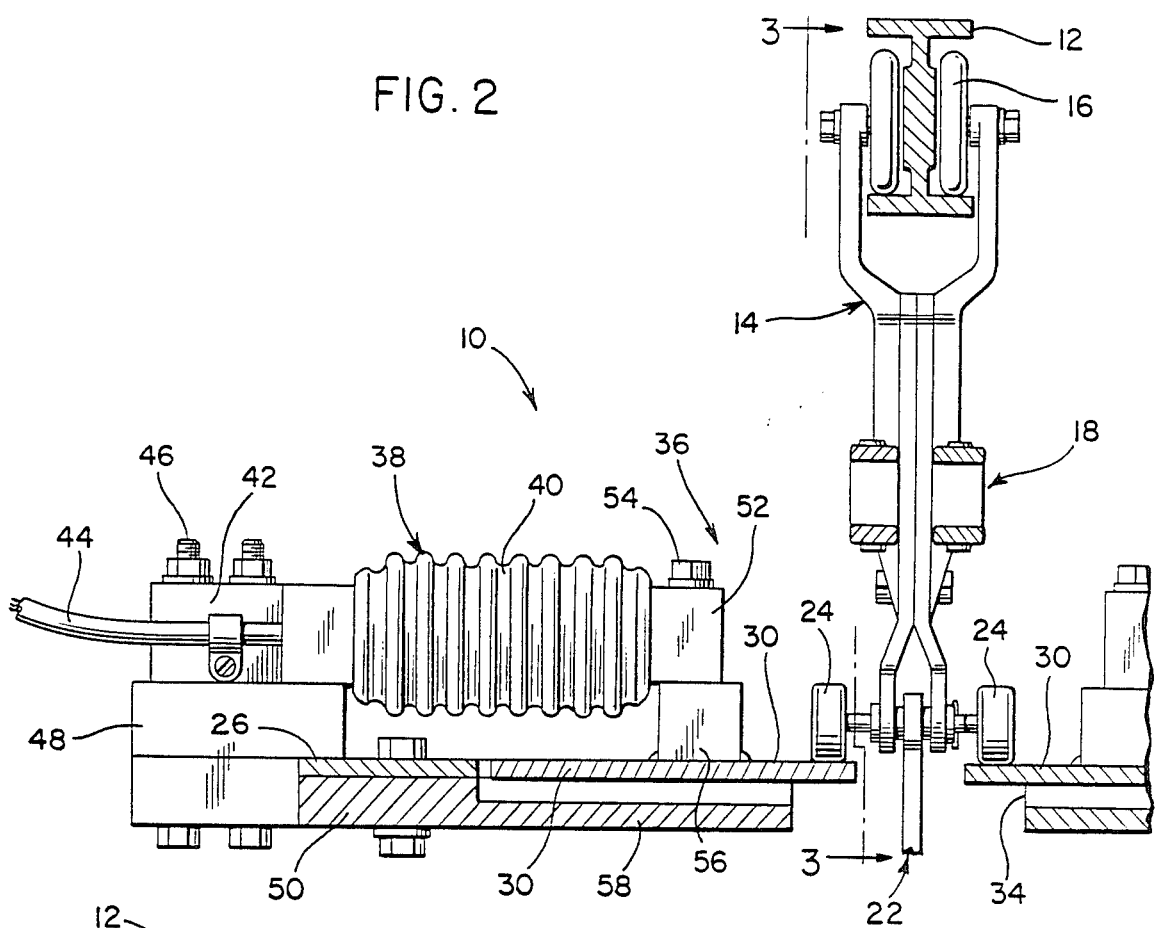
FIG. 2 is a transverse section taken substantially through a plane indicated by section line 2—2 in FIG. 1.
Figure 3:
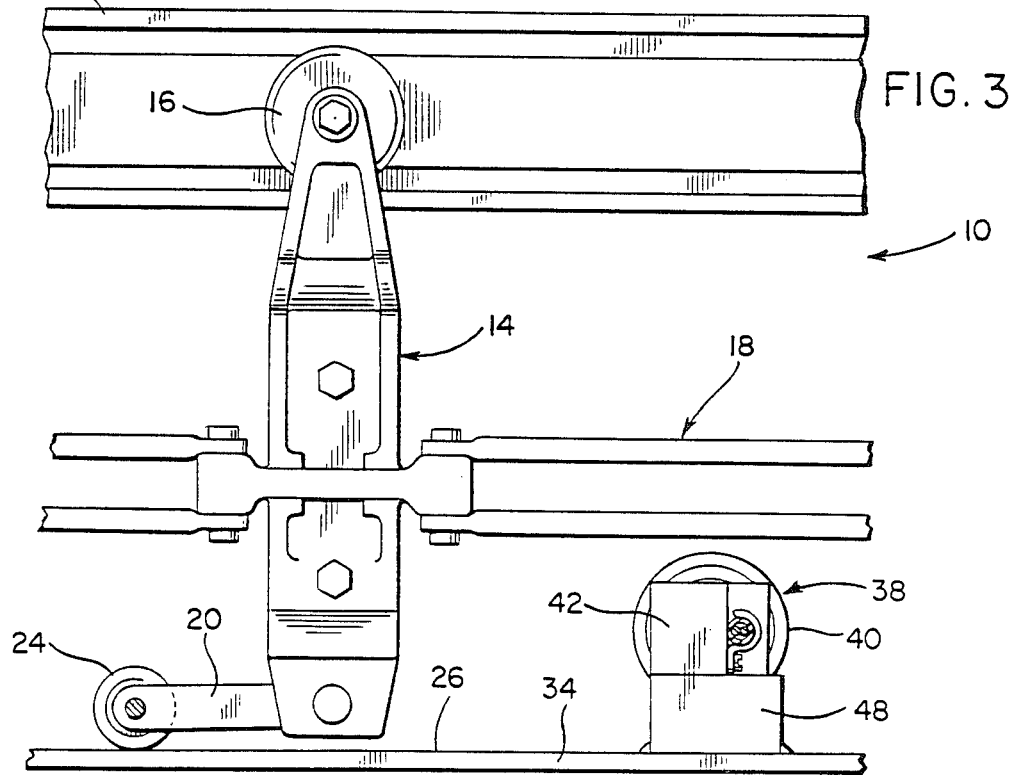
FIG. 3 is a partial section view taken substantially through a plane indicated by section line 3—3 in FIG. 2.

Referring now to the drawings in detail, FIGS. 1, 2 and 3 illustrate a typical installation for the load weighing system of the present invention, generally referred to by reference numeral 10. In the illustrated embodiment, the weighing system is associated with a poultry processing conveyor of the overhead type having a fixed overhead I-beam 12 on which suspension link assemblies 14 are guidingly supported by rollers 16. The link assemblies 14 are interconnected with spaced links of a conveyor chain 18 spaced below the beam 12, through which movement is imparted to the link assemblies 14. The lower ends of the suspension link assemblies are pivotally connected through pulling links 20 to load carrier shackles 22. By means of rollers 24 mounted at the upper ends thereof, the load of the shackles are supported during a weighing operation on a pair of laterally spaced tracks 26. As is already known in the art, such tracks 26 are fixedly mounted and form a gap therebetween through which the conveyor path 28 extends as shown in FIG. 1. Thus, the shackles 22 are continuously moved by the conveyor chain 18 along path 28 while suspended below the tracks 26. Each shackle is weighed when its rollers 24 move over laterally aligned platforms 30 which extend limited distances along the conveyor path within recesses 32 formed in the confronting edges 34 of the tracks 26.

In accordance with the present invention, the tracks 26 mount a plurality of load detecting scale assemblies, respectively denoted by reference numeral 36. The scale assemblies 36 are spaced from each other along the conveyor path and each includes the pair of platforms 30, aforementioned, through which the shackle loads are transferred to a pair of load beam cells 38 of a well known strain gauge type, such as the load cells and force transducers manufactured by Hottinger Baldwin Messtechnik of West Germany. Each load cell 38 has a metallic bellows portion 40 connected at one axial end to an anchoring portion 42 from which electrical signal cable 44 extends. The anchoring portion 42 is secured by fasteners 46 to an anchor block 48 fixed to a mounting plate 50, as shown in FIG. 2, secured in underlying relation to the fixed track 26. The other axial end of the metallic bellows portion 40 of the load cell 38 is connected to the load receiving end portion 52 secured by fastener 54 to an anchor block 56 fixed as by welding to the platform 30. The platform overlies a motion limiting extension 58 of plate 50, from which it is vertically spaced as shown. Electrical energy is supplied to each load cell 38 and output signals conducted therefrom through the cable 44, aforementioned.

Figure 5:
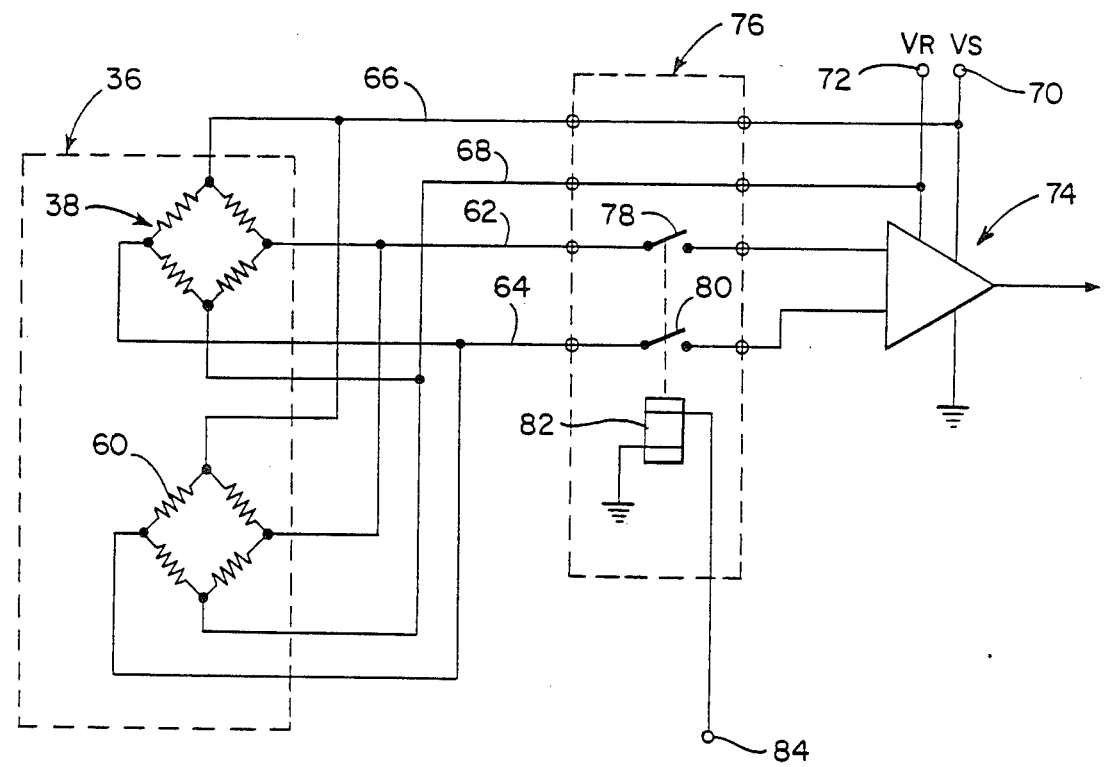
FIG. 5 is an electrical circuit diagram showing in greater detail a portion of the system depicted in FIG. 4.

As shown in FIG. 5, each pair of load cells 38 forming one of the load detecting scale assemblies 36, are electrically represented as bridge circuits in which the resistances of the resistive strain gauge components 60 are varied in dependence on beam loading of the cells to supply analog output signals through lines 62 and 64 when power is supplied to the cells through voltage lines 66 and 68 from a system voltage source terminal 70 and a reference voltage terminal 72. The analog outputs in lines 62 and 64 are fed to the inputs of an amplifier 74 through a terminal switch assembly 76 in accordance with the present invention. The switch assembly in one embodiment may include relay switches 78 and 80 controllably opened through relay coil 82 in response to a selective disabling signal at terminal 84 in order to prevent any analog output from being transmitted.

Figure 4:
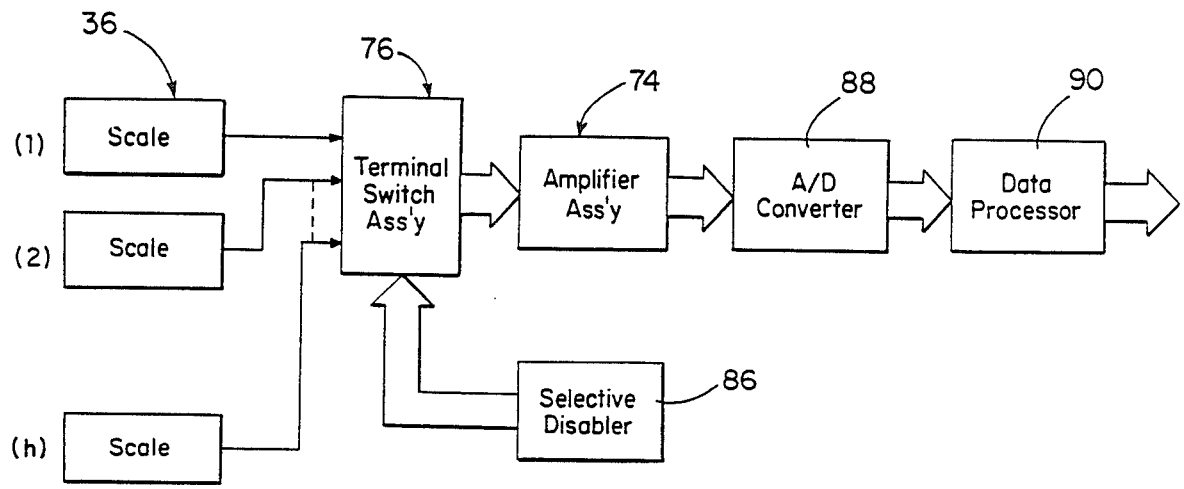
FIG. 4 is a schematic block diagram of the weighing system associated with the physical arrangement shown in FIGS. 1-3.

As depicted in FIG. 4, the selective disabling signals originate from a component 86 operatively connected to the terminal switch assembly 76 through which any one or more of the plurality of scale assemblies 36 may be disabled. The analog outputs of the enabled scale assemblies are amplified by the amplifiers 74 and then digitized by an analog-to-digital converter 88. Thus, digitized weight measurement data originating from the enabled scale assemblies during each weighing operation are fed to a data processor 90 from which a corrected weight measurement readout is obtained in the form of a visual display, printout or as input data for further data processing in connection with operations such as weight totalizing or weight sorting as aforementioned.

Figure 6:
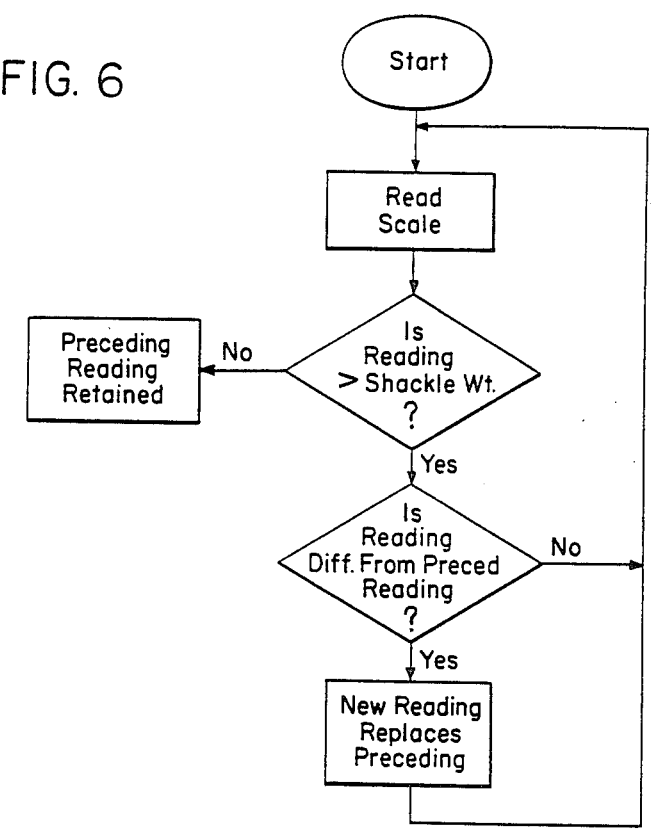
FIG. 6 is a software flow chart illustrating the weighing portion of the program associated with the data processor depicted in FIG. 4.
Figure 8:
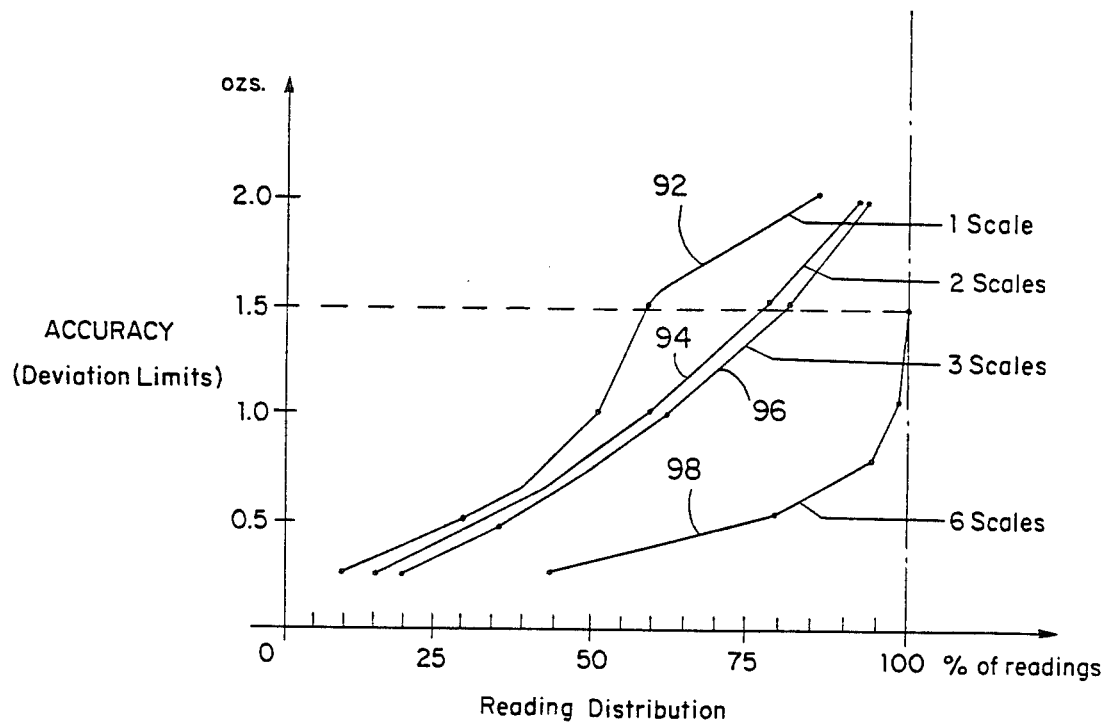
FIG. 8 is a graphical illustration of the error-correcting capabilities of the load weighing arrangement in accordance with the present invention.

FIG. 6 illustrates a typical program followed in processing the digitized outputs or readings from the respective scale assemblies 36 in accordance with the present invention, in order to limit the data processing operation to only product loaded shackles. It has been found that a significant improvement in weight measurement will be achieved in such use of a plurality of scale assemblies during a weighing operation for each load, when the respective digitized outputs of the scale assemblies are averaged during the data processing operation. Such accuracy improvement is demonstrated by a comparison of the curves 92, 94, 96 and 98 in FIG. 8, plotting the distribution of averaged weight readings obtained from a large number of weighing operations for a known reference load (6 lbs.) with respect to accuracy in terms of weight deviation limits. As seen from the curves graphed in FIG. 8, accuracy increases with the number of scales utilized. No averaged readings fall outside an accuracy deviation limit of 1.5 ozs., for example, when 6 scales are utilized. Thus, it will be apparent, that for any given installation, a statistically ideal number of scales may be empirically determined and enabled to obtain acceptable weight measurement accuracy through use of the arrangement of the present invention.

Figure 7:
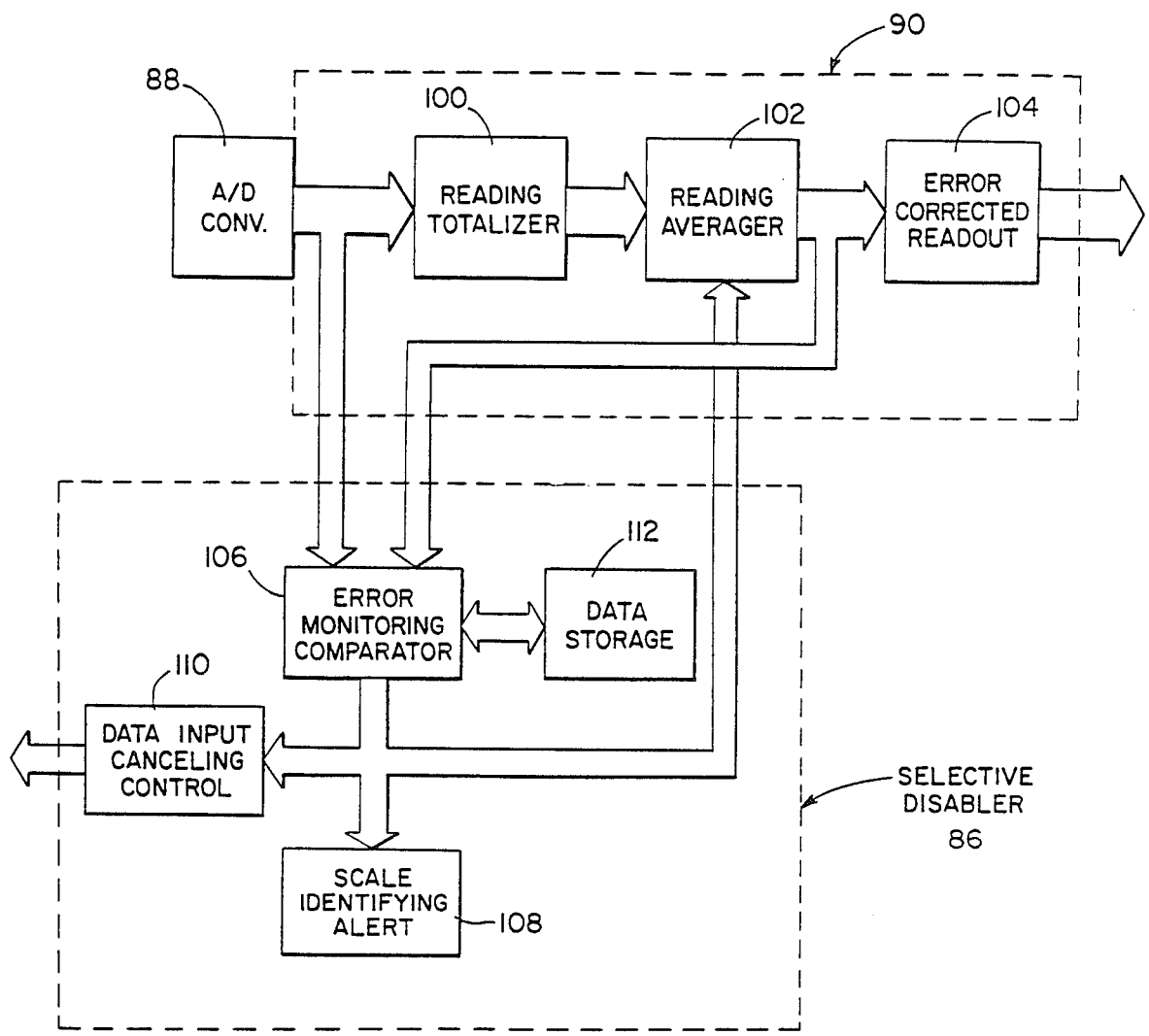
FIG. 7 is a functional block diagram illustrating in greater detail of the system depicted in FIG. 4.

As aforementioned, by monitoring readings from each individual scale assembly 36 and cancelling those readings which deviate excessively from the weight measurement readout corrected by the data averaging action of the data processor 90, acceptable and consistent accuracy may be achieved. FIG. 7 illustrates by way of example one method for effecting the selective scale disabling and erroneous reading cancelling operation. The digitized outputs from the enabled scale assemblies corresponding to each weighing operation are totalized at 100 and averaged at 102 to provide the error-corrected readout at 104 through the basic data processing operation. The individual digitized outputs from converter 88 are compared with the averaged reading output from 102 by an error monitoring comparator 106 during a selective disabling operation, in order to (a) identify malfunctioning scales through an alerting device 108, (b) correct the averaged reading output of 102 accordingly and, (c) disable the identified scale through data cancelling control 110. Such action of comparator 106 may be referenced with respect to experience data gained by its interfacing with a data storage component 112.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a conveyor from which a plurality of load supporting shackles are suspended during continuous movement along a conveyor path, a system for weighing loads carried by the shackles during said movement thereof, comprising a predetermined number of load sensing devices, means mounting said load sensing devices at locations spaced along the conveyor path for successive loading by each of the loads carried on the shackles during said movement thereof, means connected to said load sensing devices for transmitting repetitive measurement data therefrom with respect to each of the loads, and data processing means connected to the data transmitting means for transforming the repetitive measurement data from the load sensing devices into an error corrected readout with respect to each of the loads.

2. The combination of claim 1 wherein each of said load sensing devices includes a pair of electrical strain gauges mounted in aligned laterally spaced relationship to the conveyor path at each of said locations therealong, and load transfer means engageable by the shackles during said movement thereof for deforming the strain gauges to generate the repetitive measurement data.

3. The combination of claim 2 wherein said data processing means includes means for averaging the repetitive measurement data transmitted thereto from the load sensing devices to produce said error corrected readout.

4. The combination of claim 3 wherein said predetermined number of the load sensing devices is empirically determined to establish statistically optimum accuracy of the error corrected readout.

5. The combination of claim 3 wherein said predetermined number of the load sensing devices exceeds an empirically determined value establishing statistically acceptable accuracy of the error corrected readout, and means for selectively disabling the load sensing devices to reduce said predetermined number to no less than said empirically determined value.

6. The combination of claim 5 wherein said selective disabling means includes error monitoring means for detecting excessive deviation of the measurement data from the error corrected readout, alerting means connected to the error monitoring means for identifying the load sensing devices from which the excessive deviation is detected and means responsive to said detection of the excessive deviation for cancelling the measurement data transmitted by the data transmitting means from the identified load sensing devices.

7. The combination of claim 1 wherein said predetermined number of the load sensing devices is empirically determined to establish statistically optimum accuracy of the error corrected readout.

8. The combination of claim 1 wherein said predetermined number of the load sensing devices exceeds an empirically determined value establishing statistically acceptable accuracy of the error corrected readout and means for selectively disabling the load sensing devices to reduce said predetermined number of the load sensing devices from which the measurement data is transmitted.

9. The combination of claim 8 wherein said selective disabling means includes error monitoring means for detecting excessive deviation of the measurement data from the error corrected readout, alerting means connected to the error monitoring means for identifying the load sensing devices from which the measurement data excessively deviates from the error corrected readout and means responsive to said detection of the excessive deviation for cancelling the measurement data transmitted by the data transmitting means from the identified load sensing devices.

10. In combination with a conveyor continuously moving a load along a predetermined path, a system for weighing said continuously moving load comprising, a plurality of load sensing devices spaced along said path for successive loading by said load during a weighing operation, signal transmitting means connected to the load sensing devices for receiving a plurality of repetitive inputs therefrom in response to said successive loading thereof by the load during the weighing operation and data processing means connected to the signal transmitting means for transforming the repetitive inputs received during said weighing operation into a weight measurement of the load.

11. The combination of claim 10 including means for selectively disabling some of the load sensing devices to increase accuracy of said weight measurement.

12. The combination of claim 11 wherein said selective disabling means includes error monitoring means for detecting deviation of the respective inputs from the weight measurement and means responsive to said deviation detection by the error monitoring means for cancelling the deviating inputs otherwise received by the signal transmitting means.

13. In combination with a conveyor continuously moving spaced load carriers along a conveyor path and a plurality of load sensing devices engageable by the load carriers during said movement thereof for weighing loads supported thereon, a method of obtaining an accurate weight measurement for each of the loads, including the steps of: successively conveying each load carrier past a predetermined number of said load sensing devices along the conveyor path to obtain repetitive weight measurements therefrom during a single weighing operation; and averaging said repetitive weight measurements to obtain an error corrected weight measurement for said load upon completion of the weighing operation.

14. The method of claim 13 further including the steps of: monitoring each of the load sensing devices to detect excessive deviation of the weight measurements from the error corrected measurement; and disabling those of the load sensing devices from which the excessive deviations originate.

15. A method of accurately weighing a load continuously moving along a path, by means of load detecting devices from which weight measurements are obtained, including the steps of: conveying said moving load successively through said load detecting devices during a weighing operation to obtain a plurality of said weight measurements therefrom; applying a data processing operation to said weight measurements to produce a corrected weight readout; monitoring the respective weight measurements to detect excessive deviation thereof from the corrected weight readout; and removing the detected weight measurements from the data processing operation.

16. The method of claim 15 wherein said data processing operation includes averaging of the weight measurements.

17. The method of claim 16 including the step of: identifying the load detecting devices from which the excessive deviation is detected; and disabling the identified load detecting devices.

18. The method of claim 15 including the step of: identifying the load detecting devices from which the excessive deviation is detected; and disabling the identified load detecting devices.

* * * * *